Feb. 17, 1931.   R. J. BELL   1,793,352
METHOD OF AND APPARATUS FOR FORMING METAL BARRELS
Filed July 30, 1929   5 Sheets-Sheet 5
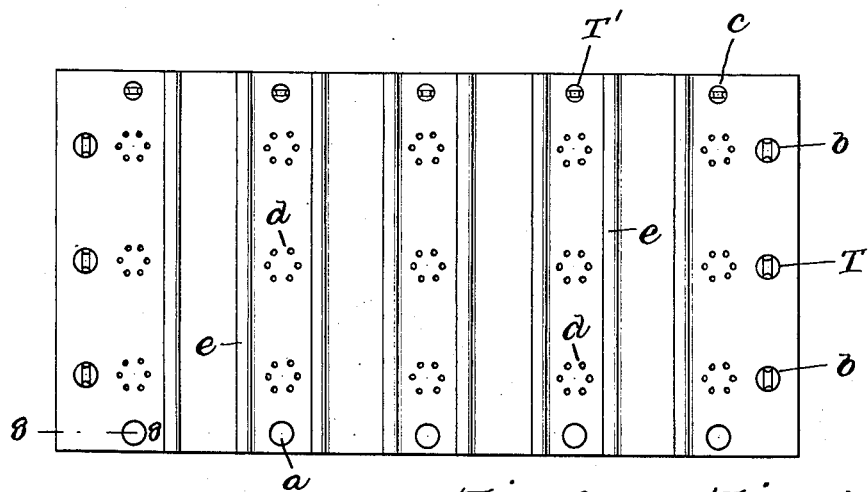
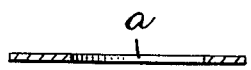
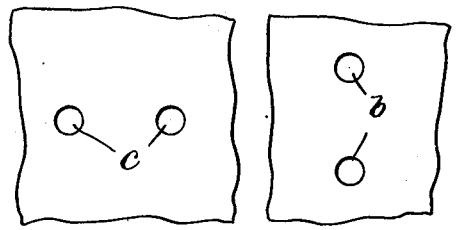
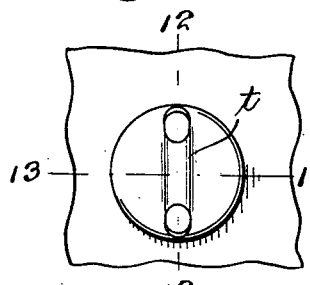
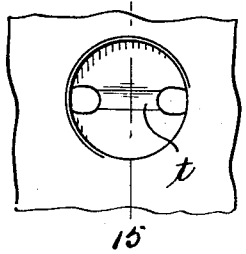
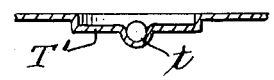

Patented Feb. 17, 1931

1,793,352

UNITED STATES PATENT OFFICE

ROBERT J. BELL, OF BALTIMORE, MARYLAND, ASSIGNOR TO R. J. BELL COMPANY, INC., OF JACKSONVILLE, FLORIDA, A CORPORATION OF FLORIDA

METHOD OF AND APPARATUS FOR FORMING METAL BARRELS

Application filed July 30, 1929. Serial No. 382,179.

This invention relates to a method of and apparatus for forming metal barrels, kegs, boxes and other containers of any size or shape which are composed of two semicircular sections, the general object of the invention being to provide means for forming each section from a straight blank of material and including means for punching holes in the blank, some of which are arranged in pairs, then forming teats from the portions carrying the pairs of holes so that said pairs are arranged in the teats, then corrugating the blank and finally bending the blank into a semicircle.

Another object of the invention is to provide means for forming groups of holes in certain portions of the blank when it is desired to produce a ventilated barrel.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 7 is a view of the blank containing the holes, corrugations and teats thereon.

Figure 8 is a section on line 8—8 of Figure 7.

Figure 9 is a fragmentary view showing that portion of the blank which contains a pair of holes.

Figure 10 is a similar view, but showing a pair of holes arranged at an end of the blank.

Figure 11 is a fragmentary view showing the teat having a rib thereon, the ends of which terminate in the holes.

Figure 12 is a section on line 12—12 of Figure 11.

Figure 13 is a section on line 13—13 of Figure 11.

Figure 14 is a view showing one of the oppositely arranged teats.

Figure 15 is a section on line 15—15 of Figure 14.

Figure 16 is a fragmentary sectional view through one of the rollers, showing a spring actuated plunger for ejecting the metal punched from the blank and forming the holes.

Figure 17 is a fragmentary sectional view showing the punches for forming a group of ventilating holes.

Figure 1:
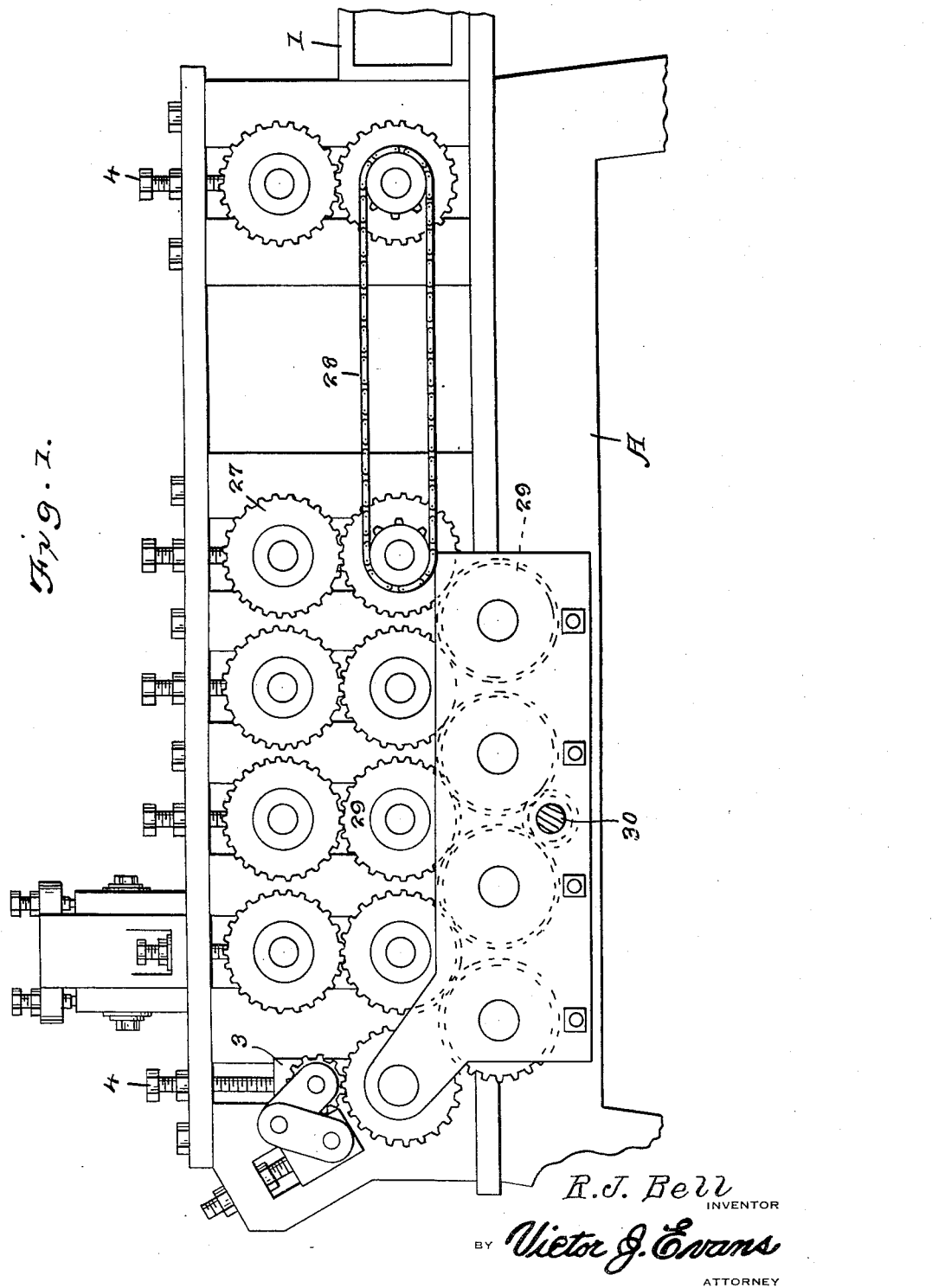
Figure 1 is a side view of the apparatus.
Figure 2:
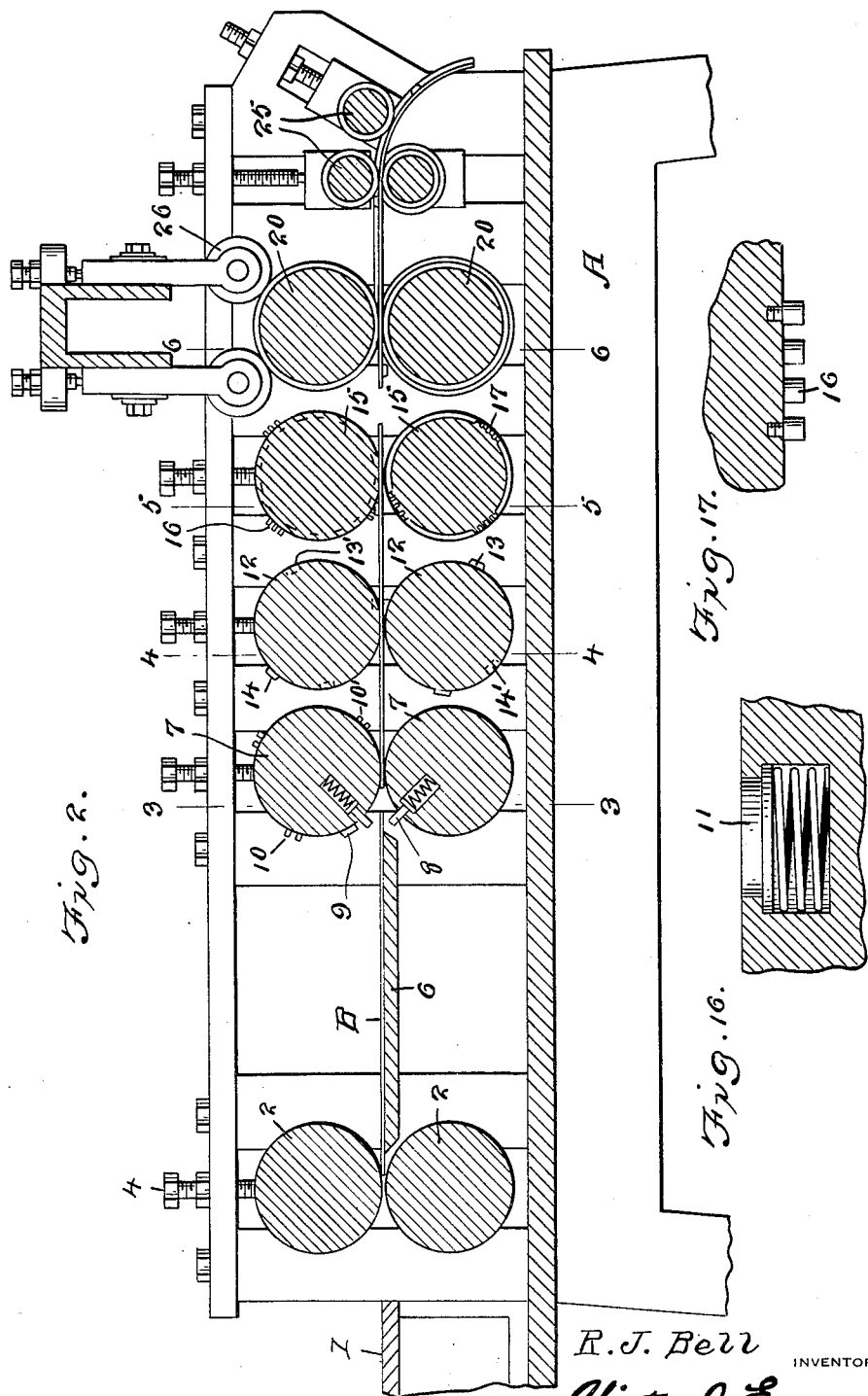
Figure 2 is a vertical longitudinal sectional view.
Figure 3:
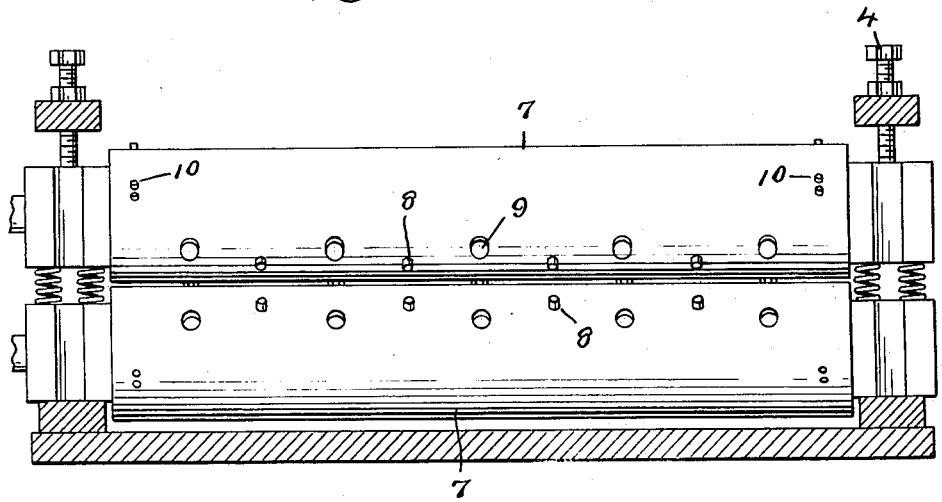
Figure 3 is a section on line 3—3 of Figure 2.
Figure 4:
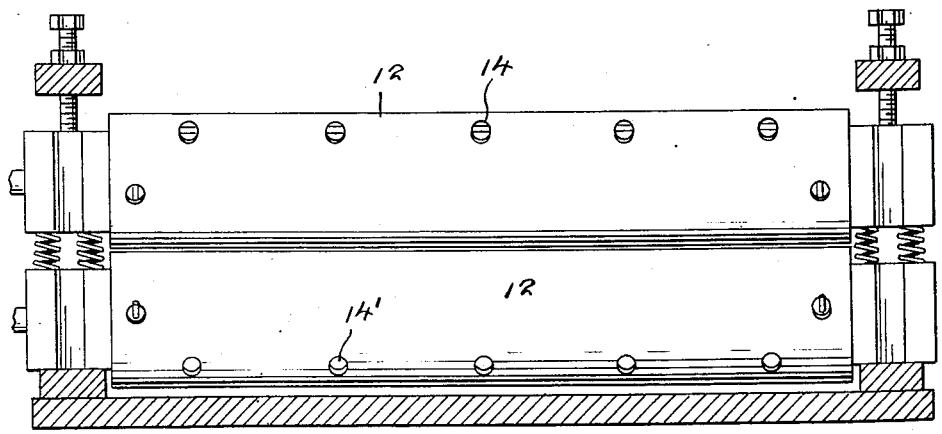
Figure 4 is a section on line 4—4 of Figure 2.
Figure 5:
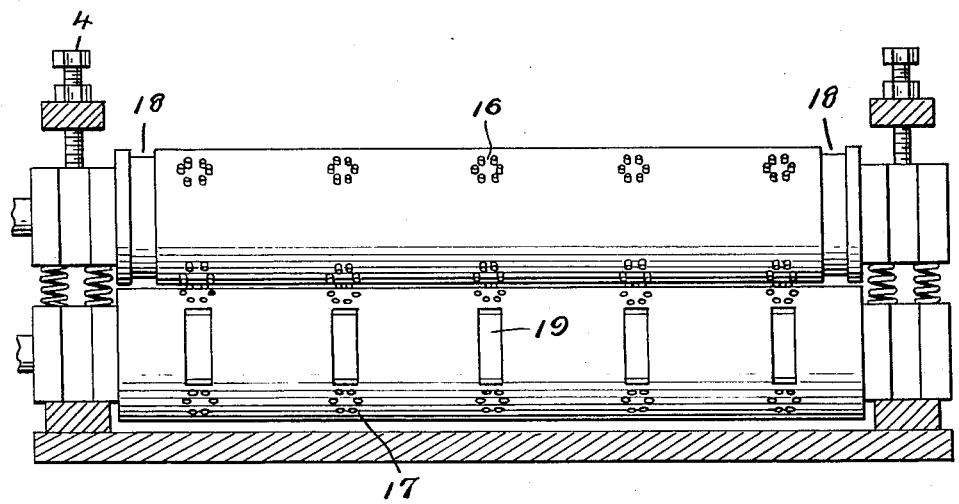
Figure 5 is a section on line 5—5 of Figure 2.
Figure 6:
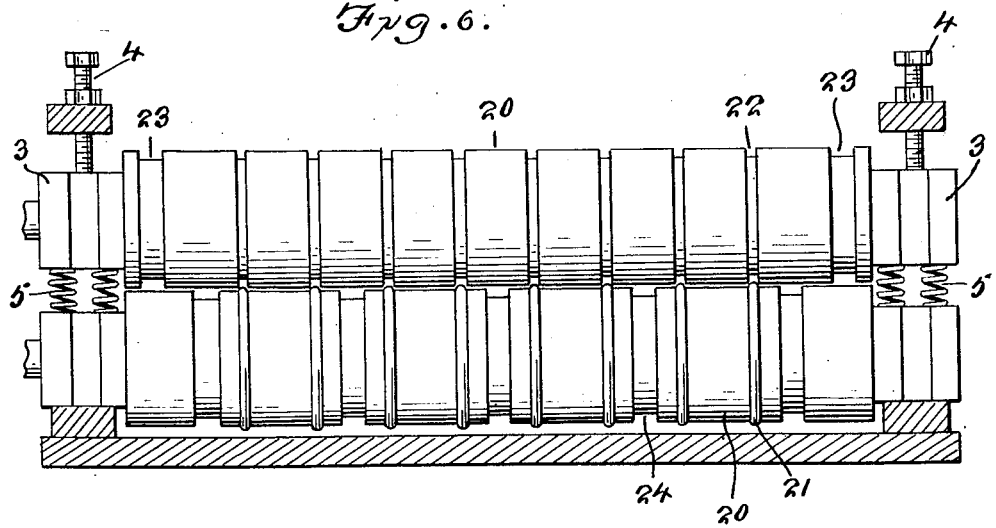
Figure 6 is a section on line 6—6 of Figure 2.

In these views, the letter A indicates a supporting frame which is provided with a feed table 1 at one end thereof on which the blank B, from which the barrel section is formed, is placed, and adjacent this table is arranged a pair of rolls 2 having their pintles suitably journaled in the frame, the pintles of the upper roll being carried by the vertically movable boxes 3 which are adjusted by the set screws 4, springs 5 being placed between the upper and lower boxes and tending to raise the upper boxes. These rolls 2 are plain rolls and act to feed the blank on to a second table 6 suitably supported in the frame. A pair of rolls 7 receive the blank from the table 6 and each roll 7 is provided with a spring pressed plunger 8, these plungers tending to engage the forward end of the blank upon the table 6 and feed it between the rolls 7 as the rolls revolve. One of these rolls 7 is formed with a longitudinally extending row of large punches or dies 9 for punching the large holes $a$ in the front side edge of the blank and it also carries a number of pairs of small punches 10 adjacent each end and a longitudinally extending row of similar punches 10'. The punches 10 form the pairs of small holes $b$ adjacent each end of the blank and the pairs of small holes $c$ at the rear side edge of the blank. The lower roll 7 is, of course, provided with holes for receiving the punches of the upper roll and the metal punched from the blank by the same. Suitable spring plungers, such as shown at 11 in Figure 16, may be provided for ejecting the metal from the holes.

Another pair of rolls 12 receive the blank from the rolls 7 and the lower roll 12 is formed with the dies 13 at its ends for forming the teats T at the ends of the blank from those portions which carry the pair of holes b so that each teat has a pair of holes passing through it. The upper roll 12 is formed with the female dies 13' which cooperate with the metal dies 13 of the lower roll to form the teats, and as shown in Figures 11 to 15, each teat is formed with a rib t, the ends of which terminate in the holes. The upper roll 12 is formed with a longitudinally extending row of male dies 14, similar to the dies 13, and the lower roll 12 is formed with a similar row of female dies 14' which cooperate with the dies 14. These dies 14 and 14' will form teats T' at the rear edge of the blank in those portions thereof through which the pairs of small holes c are punched.

Thus after the blank passes through the pairs of rolls 7 and 12, the blank will have a row of large holes a at its front edge and upwardly extending teats T at each end thereof and downwardly extending teats T' adjacent its rear side edge, each teat having a rib thereon, with its ends open so that a wire can be passed through the teats after the same has been passed through a large hole of another section, thus locking the sections together.

A pair of rolls 15 receive the blank from the rolls 12 and the upper roll 15 is formed with a plurality of groups of punches 16 for punching the groups of ventilating holes d in the blank, the bottom roll 15 having the groups of holes 17 for receiving the punches 16. The top roll 15 is formed with the annular grooves 18 adjacent its ends through which the teats T at the ends of the blank pass, and the bottom roll is formed with the grooves 19 through which the teats T' at the rear edge of the blank pass. Thus the teats can pass between the rolls 15 without being damaged. The upper rolls of the pairs 7, 12 and 15 can be adjusted toward and from the lower rolls by the set screws 4, as described for the first pair of rolls 2.

A pair of corrugating rolls 20 receive the blank from the rolls 15 and these rolls form the corrugations e in the blank. These corrugations are formed by the beads 21 on the lower roll 20 and the corresponding grooves 22 in the upper roll. The upper roll is provided with the annular grooves 23 adjacent its end through which pass the teats T at the ends of the blank and the lower roll 20 is formed with a number of annular grooves 24 through which the teats T' at the rear edge of the blank pass. From these rolls 20, the blank passes to the bending rolls 25 and as these rolls and the rolls 20 form part of an application filed by me on March 13, 1929, Serial No. 346,628, it is not thought necessary to describe them in detail. As described in said application, the bending rolls bend the blank into semi-circular form and these bending rolls are provided with grooves so that they will not press back the metal forming the teats and corrugations. The rolls 20 are provided with the presser rolls 26, as described in the said application.

When it is not desired to form ventilating holes in the blank, the punches 16 can be removed so that the blank will pass between the rolls 15 without being punched, or if desired, these rolls can be removed and plain rolls substituted therefor, though, of course, these rolls must be provided with the grooves for preventing the teats from being damaged as the blank passes between them.

Any desired means may be used for synchronously rotating the rolls to cause the blank to properly pass through the apparatus, though Figure 1 shows each pair of rolls geared together by the gears 27, with a chain and sprockets 28 connecting the lower feed roll 2 with the lower roll 7 and the lower gears of the lower rolls 7, 12, 15 and 20 meshing with the drive gears 29 which are driven from the power shaft 30. The dies or punches are removable so that new ones can be substituted for the old ones when the old ones have become worn.

As will be seen, this apparatus will form in one operation a semi-circular section having the various holes and teats therein, from a blank of material. Two of the sections are placed together, with the teats T' of one section entering the holes a of the opposite section and after the two sections are placed together, a rod is passed through the holes c in the teats so as to lock the sections together. Caps are provided for the ends of the barrel which are formed with holes in their flanges to receive the teats T at the ends of the body of the barrel, with a wire passing through the holes in these teats to fasten the cap to the body. The barrel produced is similar to the barrel shown in my Patent 1,651,317, dated November 29, 1927. As before stated, when it is not desired to produce a ventilator barrel, the ventilating holes d are not punched in the blanks.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. The herein described method consisting in first punching large holes in one side edge of a blank of material and pairs of small holes adjacent the ends of the blank and adjacent the other side edge, then forming teats in those portions of the blanks in which the pairs of holes are formed so that the holes will pass through the teats, then corrugating the blank and finally bending the blank into semicircular form.

2. The herein described method consisting in forming large holes in a blank of material adjacent one side edge thereof and pairs of small holes adjacent each end of the blank and adjacent the opposite side thereof, the pairs of small holes at each end of the blank being parallel to the end of the blank and the pairs of small holes at the side of the blank being parallel to the side edge, then forming teats in those portions of the metal which are punched with the small holes so that each pair of small holes is arranged in a teat, then punching ventilating holes in the blank, then corrugating the blank, the corrugations being spaced from the holes and teats and finally bending the blank into semicircular form.

3. An apparatus of the class described comprising a supporting frame, a plurality of pairs of rolls journaled therein, the first pair of rolls being plain and acting as feed means for a blank of material, means carried by the next pair of rolls for punching a row of large holes in the front edge of the blank and pairs of small holes adjacent each end edge and adjacent the rear side edge, means carried by the next pair of rolls for forming teats in those portions of the blanks through which the small holes pass so that each pair of holes pass through a teat, means carried by another pair of rolls for forming corrugations in the blank and bending rolls journaled in the frame for bending the blank into semicircular form.

4. An apparatus of the class described comprising a supporting frame, a plurality of pairs of rolls journaled therein, the first pair of rolls being plain and acting as feed means for a blank of material, means carried by the next pair of rolls for punching a row of large holes in the front edge of the blank and pairs of small holes adjacent each end edge and adjacent the rear side edge, means carried by the next pair of rolls for forming teats in those portions of the blank through which the small holes pass so that each pair of holes pass through a teat, means carried by another pair of rolls for forming corrugations in the blank, bending rolls journaled in the frame for bending the blank into semicircular form, a pair of rolls located in front of the corrugating rolls and means carried thereby for forming ventilating holes in the blank.

5. An apparatus of the class described comprising a supporting frame, a plurality of pairs of rolls journaled therein, the first pair of rolls being plain and acting as feed means for a blank of material, means carried by the next pair of rolls for punching a row of large holes in the front edge of the blank and pairs of small holes adjacent each end edge and adjacent the rear side edge, means carried by the next pair of rolls for forming teats in those portions of the blank through which the small holes pass so that each pair of holes pass through a teat, means carried by another pair of rolls for forming corrugations in the blank, bending rolls journaled in the frame for bending the blank into semicircular form, a pair of rolls located in front of the corrugating rolls and means carried thereby for forming ventilating holes in the blank, such means being removable.

6. An apparatus of the class described comprising a supporting frame, a plurality of pairs of rolls journaled therein, the first pair of rolls being plain and acting as feed means for a blank of material, means carried by the next pair of rolls for punching a row of large holes in the front edge of the blank and pairs of small holes adjacent each end edge and adjacent the rear side edge, means carried by the next pair of rolls for forming teats in those portions of the blank through which the small holes pass so that each pair of holes pass through a teat, means carried by another pair of rolls for forming corrugations in the blank, bending rolls journaled in the frame for bending the blank into semicircular form, a pair of rolls located in front of the corrugating rolls, means carried thereby for forming ventilating holes in the blank, a table supported in the frame for receiving the blank from the feed rolls and spring pressed members carried by the next pair of rolls for gripping the blank and drawing it between said rolls.

7. The herein described method consisting in first punching large holes in one side edge of a blank of material and pairs of small holes adjacent the ends of the blank and adjacent the other side edge, then forming teats in those portions of the blanks in which the pairs of holes are formed so that the holes will pass through the teats.

8. An apparatus of the class described comprising a supporting frame, a plurality of pairs of rolls journaled therein, the first pair of rolls being plain and acting as feed means for a blank of material, means carried by the next pair of rolls for punching a row of large holes in the front edge of the blank and pairs of small holes adjacent each end edge and adjacent the rear side edge, means carried by the next pair of rolls for forming teats in those portions of the blanks through which the small holes pass so that each pair of holes pass through a teat.

In testimony whereof I affix my signature.

ROBERT J. BELL.